United States Patent
Burmester (10) Patent No.: US 8,550,118 B2
(45) Date of Patent: Oct. 8, 2013

(54) DEVICE FOR CONNECTING A VALVE HOUSING TO AN ACTUATOR IN A PROCESS VALVE ACTING AS A LIFT VALVE

(75) Inventor: Jens Burmester, Grambek (DE)

(73) Assignee: GEA Tuchenhagen GmbH, Buechen (DE)

( * ) Notice: Subject to any disclaimer, the term of this patent is extended or adjusted under 35 U.S.C. 154(b) by 456 days.

(21) Appl. No.: 12/867,708

(22) PCT Filed: Feb. 13, 2009

(86) PCT No.: PCT/EP2009/001020
§ 371 (c)(1),
(2), (4) Date: Sep. 16, 2010

(87) PCT Pub. No.: WO2009/100921
PCT Pub. Date: Aug. 20, 2009

(65) Prior Publication Data
US 2011/0042604 A1    Feb. 24, 2011

(30) Foreign Application Priority Data

Feb. 16, 2008   (DE) .................. 10 2008 009 606
Apr. 22, 2008   (DE) .................. 10 2008 020 098

(51) Int. Cl.
*F16K 11/044*    (2006.01)

(52) U.S. Cl.
USPC .................. 137/625.5; 251/63.6; 403/349

(58) Field of Classification Search
USPC .................. 137/625.5; 251/63.6; 403/310, 403/349
See application file for complete search history.

(56) References Cited

U.S. PATENT DOCUMENTS

| | | | |
|---|---|---|---|
| 3,219,311 A | | 11/1965 | Siver |
| 4,437,663 A | * | 3/1984 | Crisci .......................... 473/306 |
| 4,491,060 A | * | 1/1985 | Boski ............................. 92/128 |
| 4,615,191 A | * | 10/1986 | Grandy ............................ 70/26 |
| 4,756,638 A | * | 7/1988 | Neyret .......................... 403/261 |
| 5,404,614 A | * | 4/1995 | Stephens ..................... 15/327.2 |

FOREIGN PATENT DOCUMENTS

DE    20006594 U1    10/2001

\* cited by examiner

*Primary Examiner* — John Fox
(74) *Attorney, Agent, or Firm* — Vidas, Arrett & Steinkraus (57) ABSTRACT

The invention relates to a device for connecting a valve housing (2; 2.1; 2.2; 2.3; 2.4) to an actuator (3) in a process valve acting as a lift valve (1; 1.1; 1.2; 1.3; 1.4). The aim of the invention is to design a device for connecting a valve housing to an actuator in a process valve of the type in question that acts as a lift valve, is shorter and less expensive than all known devices of said type, is as safe as possible when opening, and has a very simple design. Said aim is achieved by mounting the lantern-type housing (3.1) on the valve housing (2; 2.1; 2.2; 2.3, 2.4) by means of a bayonet joint (2*f*, 2*g*/3.1*d*, 3.1*e*) or a bayonet-type joint.

17 Claims, 7 Drawing Sheets

Fig. 7

DEVICE FOR CONNECTING A VALVE HOUSING TO AN ACTUATOR IN A PROCESS VALVE ACTING AS A LIFT VALVE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a device for connecting a valve housing to an actuator in a process valve acting as a lift valve, with the valve housing consisting of at least a valve housing part, with at least a first and a second connector, which are connected to the valve housing part and which establish a connection to the internal space, with a connection opening arranged in the valve housing between the connectors, in or on which at least a seating surface is formed, with at least a translatably slidable closure part, which cooperates (cooperate) with the attributed seating surface and controls (control) the connection opening, with an actuating rod fastened on each closure part, which leads out in a sealing manner through a housing opening of the valve housing facing the connection opening and which is connected with an actuating piston of an actuator, with a lantern-type housing connecting the valve housing to the actuator, the lantern-type housing having at least at its valve housing-sided end a means for the connection with the valve housing.

The lift valve of the type designated above has the necessary characteristics of a stop valve, in which at least a component of the translative opening and closing movement of its closure part (single seat valve) formed as a seat disk or its closure parts (double-seat valve) formed as seat disks is/are oriented vertically to the attributed seating surface. The lift valve can also be realized in the framework of the mentioned embodiments as a gate valve, in which the closure part formed as sliding piston and/or the closure parts formed as sliding pistons rides or ride during the translative opening and closing movement along an attributed cylindrical seating surface. In the double seat valve a combination of seat disk and sliding piston is also known.

A closure part seal arranged in the seat disk acts together axially or axially/radially with the attributed seating surface, while a closure part seal arranged in the sliding piston acts together radially with the attributed cylindrical seating surface. The translative opening and closing movement of the respective closure part is generated via a pressure means actuated piston drive, preferably a pneumatic actuated one, wherein the return movement of an actuating piston takes place generally through a spring, preferably a coil spring. The piston drive can work, based on the closure piece and the attributed seating surface, spring closing or spring opening. For the reduction of the opening forces of the stop valve the actuating rod of the closure part can be constructed in the area of its penetration through the valve housing in the form of a so-called pressure equalization piston, so that the compressive forces acting in the lift direction on the closure part undergo a part or full compensation from the fluid (e.g. product) available in the valve housing at the projected end face of the pressure equalization piston.

There are many different embodiments of process valves of the type described above, wherein, for the purpose of a safe separation of a fluid situated in the valve housing from the pressure means acting upon the actuating piston in the actuator, a so-called lantern-type housing is arranged between the valve housing and the actuator. The opening movement of the process valves takes place, in relation to the vertical normal position of valve, either upwards or downwards, so that one speaks of a valve opening upwards or downwards. As a smallest possible overall height to the bottom is generally desired, the actuator is arranged as a rule above the valve housing.

A decisive selection criterion for process valves of the type discussed is not only its height to the bottom, but also that to the top. The latter is essentially determined by the design of the lantern-type housing and of the actuator, wherein it is already known for a reduction in height, to integrate the springs of the actuator of a double seat valve completely in the available space of the lantern-type housing (state of the art e.g. according to EP 0 646 741 B1). In another well-known process valve, which has a singular closure part, the lantern-type housing remains completely free from built-in components saving height in this regard (DE 20006 594 U1). Comparable conditions are known in a double seat valve according to DE 38 35 944 A1.

In the above mentioned double seat valves, the actuating rods of the closure members, especially when the latter are realized as sliding pistons, are designed as a rule in the form of the above mentioned pressure equalizing piston. In order to ensure sufficient compensation of the forces on the respective closure member through corresponding counteracting forces on the attributed pressure equalizing piston, these pressure equalizing pistons are extended in the cross-section mostly approximately to the effective projected cross-section of the attributed closure member. The big passing through cross-sections through the valve housing resulting therefrom on the one hand complicates the sealing of these pressure equalization pistons, on the other hand however the pressure equalizing piston provides space in its interior for a reception saving height of the springs of the valve actuator.

The type of the connection between valve housing and actuator via the lantern-type housing also exerts an influence on the height of the respective process valve, wherein this influence is actually fairly small. More decisive in this connection is the influence of this connection on the assembly- and disassembly costs as well as the costs to realize this connection. For decades essentially the following shortly outlined three forms of this connection have been realized in this regard.

On the one hand it is a connection by means of flanges which are screwed together. The publications EP 0 646 741 B1 and EP 0 174 384 B1 show respectively a connection in this regard between valve housing and lantern-type housing in a double seat valve. This connection is time-consuming in the assembly or disassembly and a twist between valve housing and actuator is only possible in the framework of the circular pitch of the connecting screws.

In the majority of all process valves of the type discussed, the so-called clamping flange connection is currently also preferred, which for example is disclosed in DE 200 06 534 U1 (process valve with a singular closure member) or in DE 38 35 944 A1 or EP 0 834 689 A1 (in each case a double seat valve). Hereby the housing parts to be connected with one another have a so-called clamping flange, which is conically inclined on its outside flank, radially outwards. The respective couple of clamping flanges, that symmetrically taper radially outwards, is held together by a divided clamping ring winding round almost 360 degrees, complementary to the inclined flanks, wherein both halves of the clamping ring are connected and held together either via a hinge on the one hand and on the other hand a screw joint or via two screw joints. A connection in this respect is easy to assemble and disassemble and makes possible a positioning of the actuator opposite the valve housing in any position. The costs for this type of connection are however higher than in the case of a screwed flange connection.

Finally it is known to carry out the connection between valve housing and actuator housing via a screw connection (e.g. so-called screwed pipe connection according to DIN 11851 or DIN 11864) (WO 2007/128360 A1). In this case, the lantern-type housing carries as a rule the groove nut and the bolt thread is integrally molded in the valve housing. This connection is preferentially used in sterile procedural processes, because the grove nut features outwardly less impact surface for contamination than a screwed flange or clamping flange connection. The costs are the highest in comparison to both the aforementioned connection types; there are no disadvantages in contrast to the aforementioned type.

The publication DE 90 13 788 U1 describes a connection piece for an accessory device for the heat and water supply, in particular for a water meter, a heat meter or a filter top part, with a stop valve that is mounted in a rotatable manner in a housing between a through position and a stop position, and with a top piece for the accessory device which can be connected in a detachable manner to the housing. Hereby the top piece is connected with the housing by means of a bayonet lock in which a bolt is guided in an L-shaped nut. The top piece is linked in such a way with the stop valve (this means concretely a traction connection in the peripheral direction, not a clamping connection in the axial direction), that in the mounting of the top piece on the housing the stop valve is opened and is closed during disassembly. For the frictional connection by force of the top piece and of the stop valve, it is preferred if a coupling member (bore hole) is connected with the top piece, the coupling member being detachably connectable with the counter coupling member (bolt) of the valve. In the positioning of the top piece the coupling member is thereby connected in frictional manner to the counter coupling member (bolt engages in hole) and the movement of the top piece (in the circumferential direction) is thereby transferred to the valve, which is correspondingly opened or closed.

In WO 2007/128 360 A1 housing aggregations for monitoring, controlling and regulating systems for a process valve are described. The respective housing aggregation consists of a sequence of individual housing adaptors, which are connected with one another via a bayonet-lock similar joint mechanism.

It is the aim of the present invention to design a device for connecting a valve housing to an actuator in a process valve of the type mentioned above that acts as a lift valve, which has a smaller construction height and is less expensive than all known devices of this type, and which is furthermore of very simple design with the greatest possible opening safety.

BRIEF SUMMARY OF THE INVENTION

The creative fundamental idea consists in realizing the connection under discussion to all process valves of the type described above acting as a lift valve, i.e. single seat as well as double seat valves in an arrangement as stop valve, tank bottom valve, switching valve, or another multiple-way valve, by means of a bayonet joint or a bayonet-type joint saving construction height. Through the bayonet mechanism the otherwise usual and expensive closure mechanisms are dispensed with at this joint, whereby the connection for the purpose of the task is considerably simplified.

A preferred embodiment of the bayonet joint provides that the preferably tubular lantern-type housing has at its valve housing-sided end at least two lantern-sided bayonet collars projecting, seen in the radial direction, radially inwards, which are respectively limited on both sides by lantern-sided bayonet recesses formed therebetween. The valve housing has, on the outside and in the circumferential area of the housing opening a corresponding number of valve housing-sided bayonet collars projecting, seen in radial direction, radially externally, which are respectively limited on both sides by valve housing-sided bayonet recesses formed there. The lantern-sided bayonet collars engage in an open position to the bayonet joint in the valve housing-sided bayonet recesses, and they engage in a closed position of the bayonet joint almost congruently behind the valve housing-sided bayonet collars.

If, as is furthermore suggested, two lantern-sided bayonet collars are provided, which face one another diametrically, or more than two are provided, which are arranged uniformly distributed over the circumference of the tubular lantern-type housing, then the actuator housing and with it a pressurizing agent connection provided thereon can be twisted selectively at 180 degrees in each case or at a smaller angle, which results from the number of bayonet collars, with respect to the valve housing and for this reason can be mounted thereon in these discrete positions.

According to another innovative thought the actuating rod is guided in a tubular bearing bush, which is arranged and fixed within the lantern-type housing and which utilizes its axial length to the greatest possible extent. This guiding of the actuating rod serves as a result also at the same time to the guiding of the actuating piston firmly connected thereto. As the actuating rod is firmly connected with the closure part, the latter experiences its axial guiding indirectly as well via the bearing bush, so that no additional height in the framework of the whole arrangement is necessary for these guiding means.

The function of the lantern-type housing, which beside its mechanical connecting function guarantees the safe separation of valve housing and actuator housing with the varying an irreconcilable fluids therein, is not affected by the mentioned bearing bush, as the latter has at least, seen in radial direction, a bearing bush opening reaching through the wall of a tubular bush shank.

So as to ensure a removal of leaks, a further suggestion provides that the at least one bearing bush opening is at least partly permeably covered by the at least one lantern opening. This at least partial cover is assured by an arrangement locked in rotation of the bearing bush inside the lantern-type housing receiving it, for example through a positive connection or gearing. In so doing the valve housing-sided bayonet collars engaging in the lantern-type housing supports the bearing bush axially downwards.

The penetrating position between the actuating rod and the valve housing requires a seal in the area of the valve opening in this regard by means of a rod seal, which must stand in the built-in state for the guarantee of a sufficient seal effect under a sufficient radial pretension. This radial pretension in the built-in state is generated by the lift valve according to the invention firstly through a minimal axial forming of the rod seal in the course of the closing operation of the bayonet joint. Thereby the rod seal and the closure part in connection with its actuating rod can still be easily disassembled without the use of special tools. This is obtained according to an advantageous embodiment in that a valve housing-sided bush flange of the bearing bush abuts against the valve housing, which surrounds externally the valve opening, and in so doing axially preloads the rod seal arranged between the valve opening and the actuating rod of enlarged cross-section.

As it cannot be excluded that in the operation of the lift valve liquid, product or cleaning means, as seen from the internal space of the valve housing, is diverted through the so-called "elevator effect" in the seal area and eventually behind the rod seal, concerns must be borne that these diverted liquids can at least drain off without pressure. For this purpose it is provided that a plurality of grooves arranged distributed over the circumference engage in the valve housing-sided front side of the bearing bush, the grooves penetrating the bearing bush throughout in these points, whereby radially outside a drainage is ensured via the bayonet joint.

According to another advantageous embodiment the bayonet joint or the bayonet-type joint is locked in its closed position automatically in a positive manner. This locking is achieved through several measures, which are partly mutually dependent. On the one hand it is provided that the tubular lantern-type housing has a slot in the extension area with respect to the circumference of at least a lantern-sided bayonet collar, the slot extending from the valve housing-sided end of the lantern-type housing a little axially therein and in so doing extending, seen in radial direction, throughout from the inside to the outside.

On the other hand it is provided that each valve housing-sided bayonet collar has radially, on the outside groove-shaped recess limited in its radial depth and its circumference extension, wherein in the closed position of the bayonet joint the recess, seen in the circumferential direction, is congruently positioned with the attributed slot. In a preferred design the respective recess, seen in the circumferential direction, is arranged centrally in the attributed valve housing-sided bayonet collar.

Furthermore, in the area of the valve housing-sided end of the bearing bush, is arranged at least a lug thereon, which on the one hand, seen in the radial direction, protrudes over the exterior edge of the bearing bush and which on the other hand, seen in the axial direction, reaches out over the valve housing-sided front face of the bearing bush. This lug, seen in the radial direction, is designed in a resilient manner and engages in the attributed slot. As a result the fixation, locked in rotation as mentioned above, of the bearing bush within the lantern-type housing is assured.

The automatic locking of the bayonet joint, which at the same time prevents its unplanned opening, succeeds in that, in connection with the characteristics presented above, in the closed position of the bayonet joint, the end of the lug engages in the attributed groove-shaped recess in the valve housing-sided bayonet collar. The resilient design of the lug allows that it can bend so far radially to the outside from the open position of the bayonet joint, that it overlaps on the way to the closed position of the bayonet joint over the outer edge of the valve housing-sided bayonet collar and slides tangentially beyond this outer edge, until it engages under elastic recovery inwards in the groove-shaped recess in a positive manner. As a result a positive connection is assured between the bearing bush and with it on the one hand lantern-type housing and on the other hand valve housing.

The invention furthermore provides that the respective characteristics presented above are applied on a stop valve and the valve housing is designed in the form of a first valve housing acting as a stop valve housing.

In the same way the respective characteristics presented above are to be applied on a tank-bottom valve, in which the second connector discharges into a tank-bottom of a tank or container from underneath and the valve housing is designed in the form of a second valve housing acting as a tank-bottom valve housing.

Furthermore, the respective characteristics presented above are to be applied on a switching valve, in which the lantern-type housing is connected via a second valve housing part having at least a fourth connector to the valve housing part and thereby the valve housing is designed in the form of a third valve housing acting as switching valve housing and in which both valve housing parts are connected via a second connection opening, in or on which a second seating surface is designed. A second additional closure part is fastened to the actuating rod, which acts together with the second seating surface via a radially acting second closure part seal and controls the second connection opening, whereby in the closed position of the second closure part, the closure part forming a first closure part and in the closed position of the first closure part, the second closure part take their respective open position. The third valve housing, considering a large range of application of the lift valve according to the invention, becomes a through housing, if it, as is suggested, has in addition to the fourth connector a fifth connector facing the fourth connector at the second valve housing part.

The valve housing of the above described stop valve, tank-bottom valve and switching valve becomes in the area of its valve housing part, also considering the range of application mentioned above, respectively a through housing, if it has in addition to the first connector also a third connector, which faces the first connector.

Finally the respective characteristics presented above are to be applied on a double seat valve which has two serially arranged closure parts moveable with respect to each other, which in the closed position of the double seat valve prevent the overflow of fluids from one valve housing part into another one, which both limit a leakage cavity in the closed as well as in the open position, which is connected with the surrounding of the double seat valve, and which, with respect to a vertical arrangement, has above the actuator common to both the closure parts, actuating their respective actuating rod.

In case non-leaking switching is desired or necessary, a preferred design of the double seat valve provides that both closure parts are designed as sliding pistons, which in the closed position of the double seat valve are sealingly received in the connection bore hole connecting the valve housing parts with one another and forming the cylindrical seating surface. The first closure part comes into abutment in a sealing manner in the course of its opening movement, before it leaves the cylindrical seating surface, against the second closure part and transfers the latter with the further opening movement as well into a full open position. The double seat valve opens upwards and has a discharge hole, which is provided in a pipe barrel arranged on the first closure part and penetrating downwards in a sealing manner in the second valve housing part, and which connects the leakage cavity with the surrounding.

The respective valve housing part of the double seat valve becomes in each case, if necessary, a through housing, if the valve housing part has additionally to the respective pipe connection a further pipe connection, which faces the other pipe connection.

BRIEF DESCRIPTION OF THE SEVERAL VIEWS OF THE DRAWINGS

A detailed representation results from the following specification and the enclosed figures of the drawing as well as the claims. While the invention is realized in the most different of embodiments, an exemplary embodiment of a preferred embodiment of the suggested device applied to different types of valve working respectively as lift valves (stop valve as single and double seat valve, tank-bottom valve and switching valve in each case as a single seat valve) is illustrated in the drawing and is described in the following according to design and function under the condition, that this embodiment shows only an example of the invention, not that the invention is only limited to this special illustrated example.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated A lift valve 1 according to the invention designed as a stop valve 1.1 (FIG. 1) consists essentially of a valve housing 2 in the form of a first valve housing 2.1 (stop valve housing), that exemplary consists of a central, preferably spherically designed valve housing part 2a, a first connector 2b extending laterally therefrom and, in relation to the representation position, a second connector 2c extending downwards (see for this also FIG. 7). It consists furthermore of a spring-closing first actuator 3 (FIG. 2) or a spring-opening second actuator 3*, in which an actuating piston 5 is respectively actuated via a first and/or second pressure means opening 3e, resp. 3e* (actuator 3*) formed in an actuator housing 3a as a rule by means of pneumatic pressure means D (pressurized air). The ventilation and aeration of the actuator 3, 3* takes place in the course of the switching movement on the side of the actuating piston 5 respectively opposite of the pressure application via a first ventilation opening 3d in a vent plug 14 (FIG. 1) and/or a not represented second ventilation opening in a likewise non represented second vent plug. The actuator 3, 3* is also conceived double-acting beside the above mentioned spring-closing or spring-opening embodiment. The last named embodiment, which is also not represented either, has, in addition to further modifications not listed here of this actuator a further pressure means opening on the other side of the actuating piston 5 at the actuator housing 3a. The valve housing part 2a has in addition to the first connector 2b a third connector 2b* if necessary, which faces the first connector 2b, so that the valve housing 2, 2.1 becomes a through housing.

In the valve housing 2, 2.1 (FIG. 2), between the connectors 2b, 2c a connection opening 2d is arranged, in or on which seating surface 2e is formed. A closure part 4 translatably slidable to the actuator 3 acts together with the seating surface 2e and controls the connection opening 2d. An actuating rod 4a/4b is fastened to the closure part 4, which is guided through a housing opening 2h of the valve housing 2, 2.1 facing the connection opening 2d sealingly out of said valve housing and is connected firmly but detachably with the actuating piston 5 of the actuator 3, 3*. The actuator 3, 3* has in the actuator housing 3a the actuating piston 5 which is moveable against the force of an actuating spring 7 respectively 7.1, 7.2 and with application of a the pressure means D. The actuating rod 4a/4b is at least extended in its penetrable area with the valve housing 2, 2. in its cross-section in such a manner, that it receives there a closure part-sided part of the actuating spring 7 respectively 7.1, 7.2 in a cup-shaped recess 4c.

The valve housing 2, 2.1 and the pneumatic actuator 3, 3* are directly connected with one another via a lantern-type housing 3.1. In so doing an actuator-sided lantern flange 3.1a provided on the side of the actuator 3, 3* at the lantern-type housing 3.1 (see here also FIG. 6) forms the valve housing-sided limitation of the actuating housing 3a. The actuator 3, 3*, on its side opposite of the valve housing, 2, 2.1, is locked with cover part (FIG. 2, 1), which externally and centrically continues in a clamping flange 3f of smaller diameter and which is also centrically penetrated by a return rod 16 or respectively a modified return rod 17 (actuator 3*) connected preferably in a detachable manner to the actuating rod 4a/4b. Either the upper end of the return rod 16, 17 indicates optically in the simplest instance the respective position of the lift valve 1 or the upper end is captured with or without contact and fed back via a control head arranged on the clamping flange 3f to an internal or external control system controlling the lift valve 1.

Figure 8:
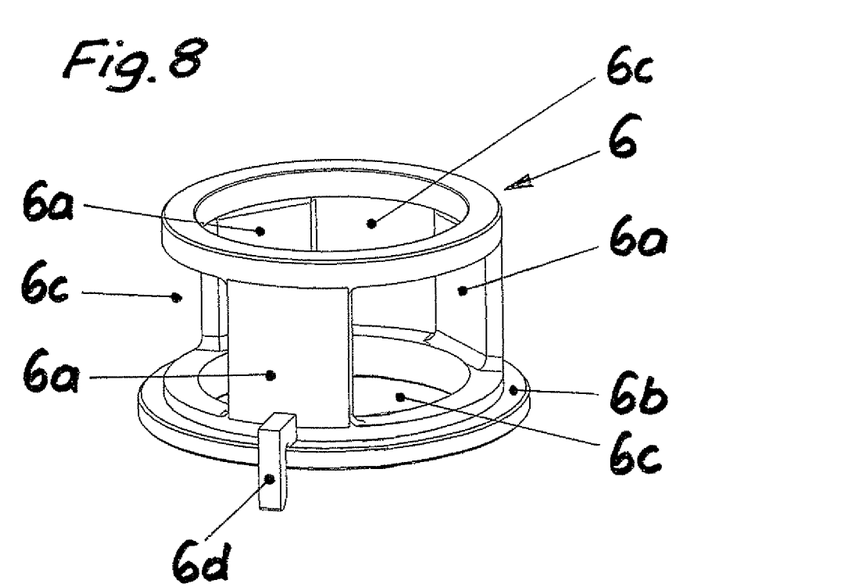
FIG. 8 shows in a first perspective representation an embodiment of a bearing bush, which is complementary to the lantern-type housing according to FIG. 6, wherein the view is directed to the longitudinal side and on the lug serving as the locking of the bayonet lock
Figure 9:
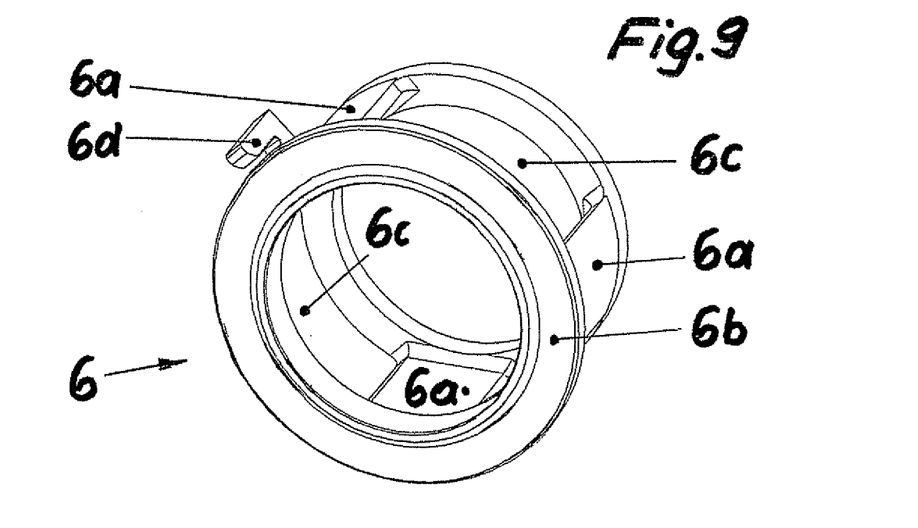
FIG. 9 shows in perspective representation the bearing bush according to FIG. 8 from an angle from the bottom.

The lantern-type housing 3.1 (FIG. 6) has a tubular lantern shaft 3.1b with the actuator-sided lantern flange 3.1a at the one end and means 3.1d, 3.1e for the connection of the lantern-type housing 3.1 to the valve housing 2, 2.1 at the other end as well as two lantern openings 3.1c diametrically arranged in the lantern shaft 3.1b, breaking therethrough. The means 3.1d and 3.1e are a lantern-sided bayonet collar 3.1d and a lantern-sided bayonet recess 3.1e. Both of the lantern openings 3.1c are at least partly covered by three bearing bush openings 6c in a bearing bush 6 (FIGS. 8, 9) in a permeable manner, so that via these openings 3.1c, 6c a connection between the surrounding of the stop valve 1.1 and an actuating rod 4a of enlarged cross-section, a so-called pressure equalizing piston is available (see also FIG. 2). The bearing bush openings 6c are formed in a tubular bush shaft 6a of the bearing bush 6, wherein the bush shaft 6a becomes at its lower end a radially outwards projecting valve housing-sided bush flange 6b.

At the lower end of the valve housing 2, 2.1 (FIG. 2), the seating surface 2a is formed above the second connector 2c, which limits the connection opening 2d for example to a not represented, continuous pipe or to a tank, in the inner wall of the central valve housing part 2a, concentrically to its vertical axis of symmetry, wherein the seating surface is realized in the exemplary embodiment cylindrically and receives in a sealing manner the closure part 4 formed as sliding piston with its closure part seal 9. The closure part seal 9 acts together only radially with the cylindrical seating surface 2e and the closed position of the stop valve 1, 1.1 is preferably limited by a firm stroke of the actuating piston 5 in the actuator 3, 3*, preferably at the actuator-sided lantern flange 3.1a.

It is also provided to realize the closure part 4 as seat disk with an axially or axially/radially acting closure part seal 9, which acts together with the attributed seating surface 2e, which is then executed axially or conically, and to limit the closed position of the lift valve 1, 1.1 by a firm stroke of the closure part 4 on the respective seating surface 2e.

The closure part 4 becomes above a connecting rod 4b of reduced cross-section (FIG. 2), which on the other hand extends to the actuating rod 4a of enlarged cross-section formed to the pressure equalizing piston. Therewith, for the compensation of pressure surges in the interior of the valve housing 2, 2.1 a counter-pressure surface 4g is attributed to the closure part 4 on the actuating rod of enlarged cross-section in the transition area to the actuating rod 4b of reduced cross-section. The actuating rod 4a of enlarged cross-section continues with undiminished cross-section from upwards up to the actuating piston 5 and is connected therewith firmly, but detachably, at its actuator-sided rod end 4e, that is preferably executed as a bolt thread. The actuating rod 4a of enlarged cross-section reaches through the central valve housing part 2a from the upper side in the housing opening 2h (see here also FIG. 7), wherein this sliding leadthrough is sealed by means of an rod seal 10 arranged in the housing opening 2h.

Figure 7:
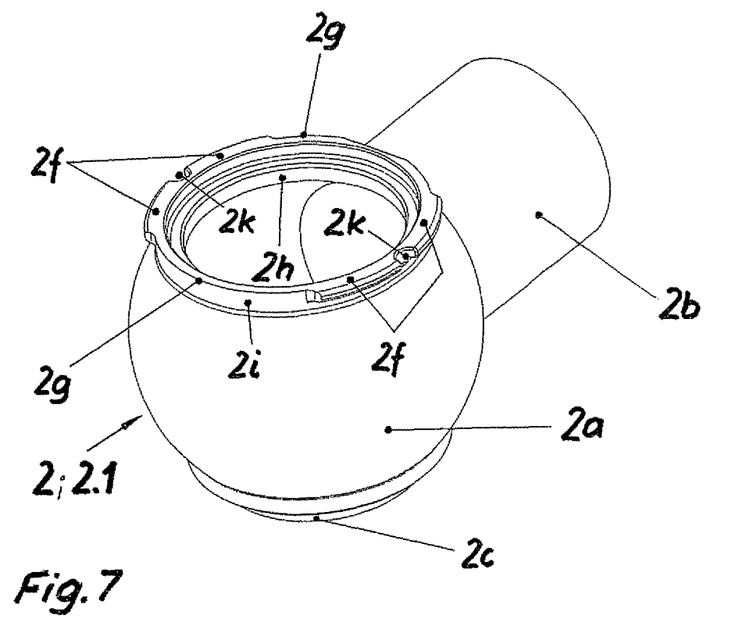
FIG. 7 shows in perspective representation an embodiment of a valve housing, wherein on the top face the complementary other half of the bayonet lock according to FIG. 6 is apparent.

The actuating rod 4a/4b is led with the closure part 4 in the tubular bearing bush 6, which is arranged inside the lantern-type housing 3.1 and is fixed and which utilizes its axial length to the greatest possible extent. In so doing the valve housing-sided bush flange 6b of the bearing bush 6 abuts against the valve housing 2, 2.1, that surrounds the housing opening 2h externally, and in so doing axially pretensions the rod seal 10 arranged between the housing opening 2h and the actuating rod 4a of enlarged cross-section. The rod seal 10 is embedded in a circular recess inside a circular connecting piece 2i, in which leads the upper end of the valve housing part 2a (FIG. 7). A plurality of grooves arranged distributed over the circumference engage in the valve housing-sided front face of the bearing bush 6, wherein the grooves penetrate throughout the bearing bush 6 in these positions. These grooves serve the above mentioned aim.

Above the bearing bush 6 the actuating rod 4a of enlarged cross-section penetrates the actuator-sided lantern flange 3.1a in a passage opening 3.1f (FIGS. 6, 2), wherein this passage is sealed by means of a first seal 11 of the actuator housing 3a. This first seal 11 ensures that no pressure means D, that is led to the space formed between the bottom side of the actuating piston 5, the actuator housing 3a and to the actuator-sided lantern flange 3.1a on the way via the first pressure means opening 3e, can escape from this space in the annular gap between bearing bush 6 and actuating rod 4a of enlarged cross-section. The seal of the actuating-sided lantern flange 3.1a opposite the actuator housing 3a takes place via a second seal 12, its fixing in the actuator housing 3a is achieved via a locking ring 13. The actuating piston 5 is sealed slidingly against the inner surface area of the actuating housing 3a by means of a non-characterized piston seal.

In the actuating rod 4a of enlarged cross-section is formed the cup-shaped recess 4c, which regarding its cross-section, extends beginning from the actuator-sided rod end 4e undiminished until the lower end of the actuating rod 4a of enlarged cross-section. Thereby the actuating rod 4a of enlarged cross-section protrudes in the closed position of the stop valve 1.1 at least the full valve lift H in the valve housing part 2a (FIG. 2), so that in the open position of the stop valve 1.1, that opens up to the actuator 3, that is after execution of the full opening lift H, the lower end of the actuating rod 4a of enlarged cross-section just about experiences a radial sealing (see also FIG. 4) with respect to the rod seal 10. A cup bottom 4f resp. 4f of the cup-shaped recess 4c serves the actuating springs 7 resp. 7.1, 7.2, which preferably is executed as coil spring and which can consist of more than an actuating spring in the form of a spring package 7.1, 7.2, as a moveable, closure part-sided spring abutment 4d. The actuating spring 7 resp. 7.1, 7.2 abuts on the other hand against the cover part 3b of the actuator 3, wherein for the purpose of centric fixation of the actuating spring 7 resp. 7.1, 7.2 a non-specified circular recess is preferably provided there. The cover part 3b forms therefore an undisplaceable actuator-sided spring abutment 3c.

Figure 2:
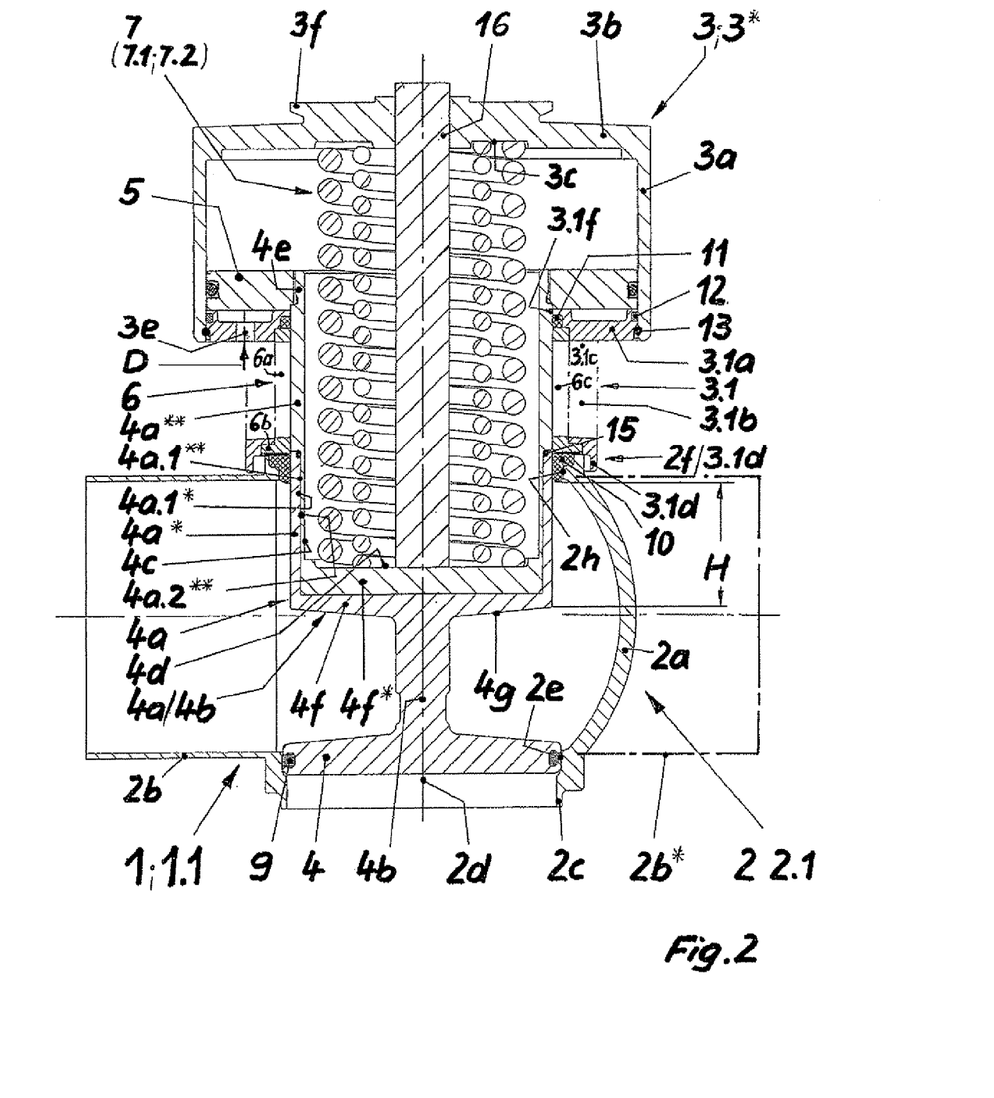
FIG. 2 shows a meridian section through a preferred embodiment of the stop valve located in its closed position according to FIG. 1 with a resilient actuator, whereby the section plane is chosen in such a way that it goes through the lantern-type and bearing bush openings overlapping in the section plane.

For the fulfillment of the US-American demands in connection with the above mentioned so-called 3-A Sanitary Standards for Compression-Type Valves, which among other things require that the actuator 3, 3* must be easily removable from the valve housing 2, 2.1 and the actuating rod 4a/4b of the closure part 4, the actuating rod 4a/4b is joined in a separable manner (FIG. 2). This separation takes place preferably in the area of the actuating rod 4a of enlarged cross-section, and to be precise in a closure part-sided part of the actuating rod 4a* and an actuator-sided part of the actuating rod 4a**. A sealed positive and frictional connection of these parts by means of a third seal 15 occurs via an internal thread 4a.1* at the closure part-sided part 4a* and an external thread 4a.1 at the actuator-sided part 4a. The actuator-sided part of the actuating rod 4a expands at its closure part-sided end into a cup 4a.2, which engages in the closure part-sided part of the actuating rod 4a* and which forms the cup-shaped recess 4c therewith the second cup bottom 4f*. Consequently in the separation of the actuating rod 4a of enlarged cross-section a lower part 4a* remains via the connection rod 4b of reduced cross-section on the closure part 4 and an upper part 4a is connected firmly, but detachably with the actuating piston 5. The cup 4a.2, which has on the inside the contour of the cup-shaped recess 4c, as it is provided in the unseparated embodiment, prevents that in the separation of the parts 4a*, 4a** the pretensioned actuating spring 7 resp. 7.1, 7.2 arranged therein can expand uncontrollably.

Figure 1:
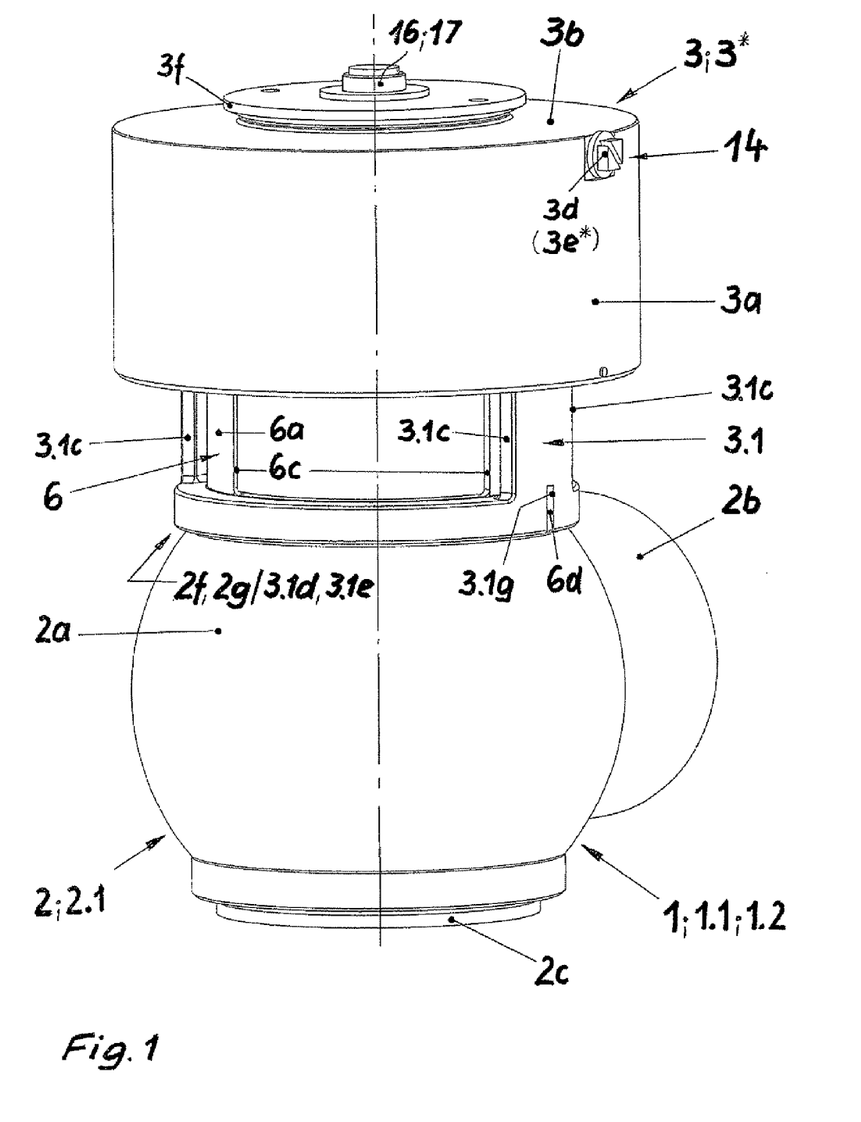
FIG. 1 shows in perspective representation an overall view of the lift valve according to the invention in a design as stop valve.
Figure 6:
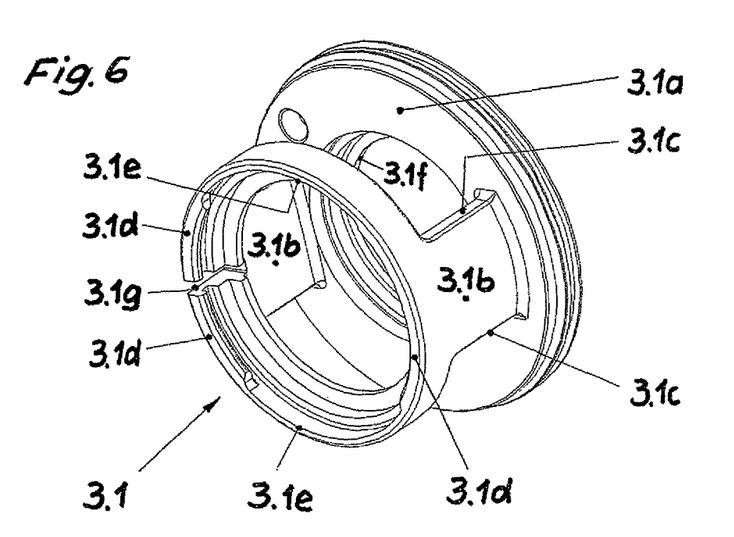
FIG. 6 shows in a perspective representation an embodiment of a lantern-type housing, that has an actuator-sided lantern flange on one end, which forms the valve housing-sided limitation of the actuator housing of the actuator, and on whose other end one half of a bayonet lock is apparent.

A positive and frictional connection between the valve housing 2, 2.1 on the one hand and the lantern-type housing 3.1 and with it also the actuator 3, 3* on the other hand is provided with a bayonet joint 2f, 2g/3.1d, 3.1e or a bayonet lock type joint (FIG. 1 in combination with FIGS. 2, 6, 7). For this purpose, the lantern-type housing 3.1 (FIG. 6) has at its valve housing-sided end at least two, lantern-sided bayonet collars 3.1*d* projecting, seen in radial direction, radially inwards, which are respectively limited on both sides by lantern-sided bayonet recesses 3.1*e* formed therebetween. The valve housing 2, 2.1 (FIG. 7) has, on its outside and in the circumferential area of the housing opening 2*h*, a corresponding number of valve housing-sided bayonet collars 2*f* projecting, seen in radial direction, radially outwards, wherein the bayonet collars are respectively limited on both sides by valve housing-sided bayonet recesses 2*g* formed therebetween. The lantern-sided bayonet collars 3.1 engage in an open position of the bayonet joint in the valve housing-sided bayonet recesses 2*g*, and in a closed position of the bayonet joint they engage in the valve housing-sided bayonet collars 2*f* almost congruently (bayonet lock 2*f*/3.1*d*).

Both the valve housing-sided bayonet collars 2*f* are arranged with regard to the first connector 2*b* preferably 90 degrees offset on the valve housing part 2*a*, such that the preferably integral joining of the connection between the first connector 2*b* and the valve housing part 2*a*, which usually takes place through machine-orbital welding, is not impeded by these valve housing-sided bayonet collars 2*f*. The valve housing-sided bayonet recess 2*g* engages radially inwards respectively up to the annular connecting piece 2*i*. In the represented exemplary embodiment two valve housing-sided bayonet collars 2*f* arranged diametrically and correspondingly two valve housing-sided bayonet recesses 2*g* form the one part of the bayonet joint 2*f*, 2*g*/3.1*d*, 3.1*e*. The two lantern-sided bayonet collars 3.1*d* arranged diametrically and the two lantern-sided bayonet recesses 3.1*e* form the other part of the bayonet joint 2*f*, 2*g*/3.1*d*, 3.1*e*. A further advantageous embodiment of the bayonet joint 2*f*, 2*g*/3.1*d*, 3.1*e* provides more than two lantern-sided bayonet collars 3.1*d*, which are arranged uniformly distributed over the circumference of the tubular lantern-type housing 3.1. The valve housing-sided part of the bayonet joint 2*f*, 2*g* is designed complementarily in this case.

The bayonet joint 2*f*, 2*g*/3.1*d*, 3.1*e* or the bayonet-type joint is locked in its closed position automatically in a positive manner (FIGS. 1, 4, 6, 7). For this purpose, the tubular lantern-type housing 3.1 or its tubular lantern shaft 3.1*b* has in the extension area with respect to the circumference of at least one lantern-sided bayonet collar 3.1*d* a slot 3.1*g* (FIGS. 6, 1) which extends from the valve housing-sided end of the lantern-type housing 3.1 a little axially therein and in so doing, seen in radial direction, throughout from the inside to the outside.

Each valve housing-sided bayonet collar 2*f* has radially outside a groove-shaped recess 2*k* limited in its radial depth and in its circumference extension (FIG. 7), wherein in the closed position of the bayonet joint, the recess 2*k*, seen in the circumferential direction, is positioned congruently with the attributed slot 3.1*g*. Here the respective recess 2*k*, seen in the circumferential direction, is preferably arranged centrally in the attributed valve housing-sided bayonet collar 2*f*.

In the area of the valve housing-sided end of the bearing bush 6 at least a lug is arranged thereon (FIGS. 8, 9, 4, 1), which on the one hand, seen in the radial direction, projects over the outer edge of the bearing bush 6 and on the other hand, seen in the axial direction, reaches out over the valve housing-sided front face of the bearing bush 6. The lug 6*d*, seen in the radial direction, is formed resiliently and engages in the attributed slot 3.1*g* (FIG. 1), whereby an definite fixing of the bearing bush 6 is ensured in the circumferential direction in the lantern-type housing 3.1.

Figure 4:
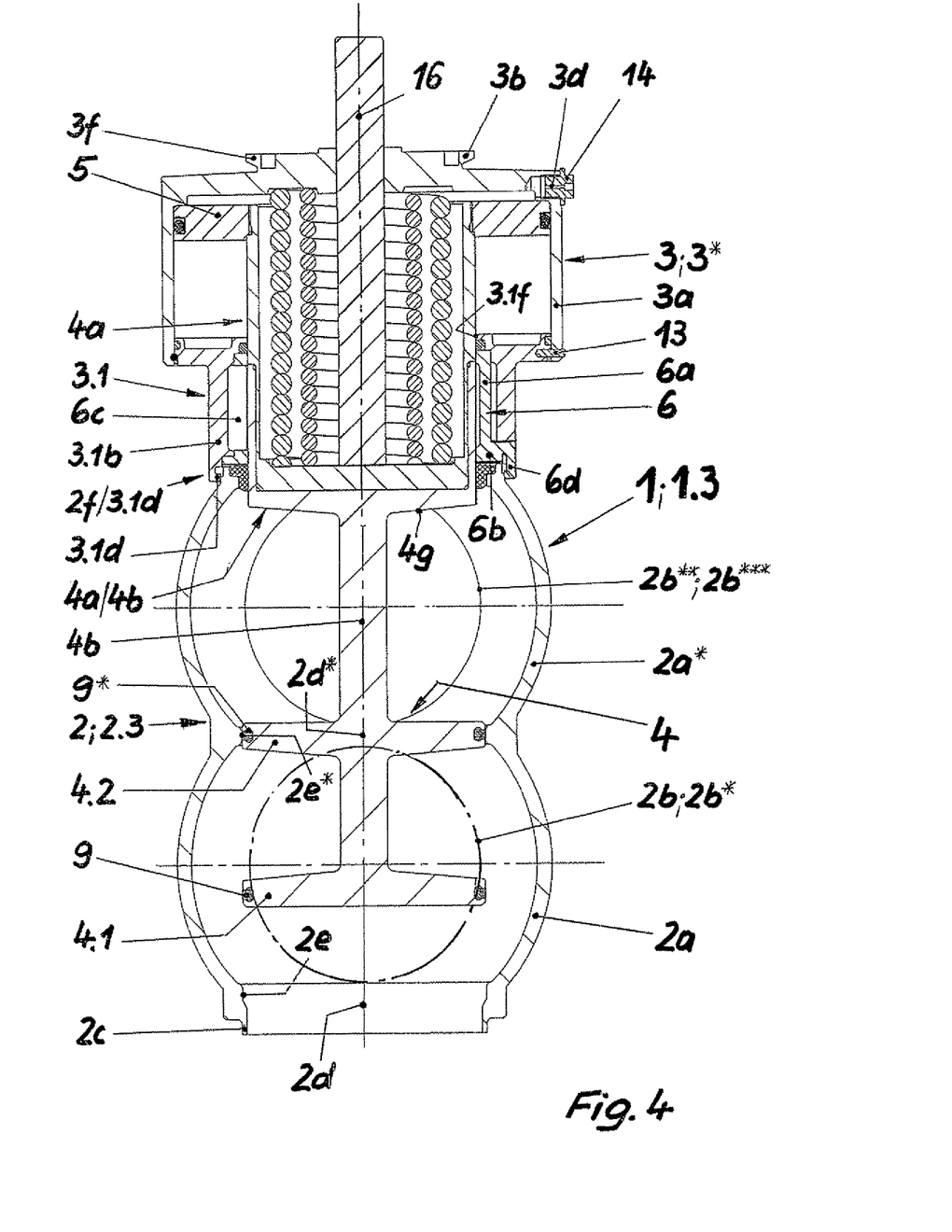
FIG. 4 shows a meridian section through the lift valve according to the invention in a design as a switching valve, whereby the uniform closure part which can be brought in two switching positions and which has two alternative sealed positions which are arranged in a distance to one another, is brought via pressure means admission against the force of the actuating spring in its upper switching position and the cutting plane is chosen so that it goes through a lug locking the bayonet joint at a bearing bush.

For the automatic positive locking of the bayonet joint 2*f*, 2*g*/3.1*d*, 3.1*e* it is provided that in its closed position the end of the lug 6*d*, engages in the attributed recess 2*k* (FIG. 4).

The above mentioned characteristics of the lift valve 1 according to the invention are applied in an advantageous manner on a switching valve 1.3 (FIG. 4), in which the lantern-type housing 3.1 is connected via a second valve housing part 2*a*\* presenting at least a fourth connector 2*b*\*\* with the valve housing part 2*a* and thereby the valve housing 2, 2.3 is designed in the form of a third valve housing 2.3 acting as a switching valve housing. Both the valve housing parts 2*a*, 2*a*\* are connected via a second connection opening 2*d*\*, in or at which a second seating surface 2*e*\* designed in a cylindrical manner is formed. In the area of the actuating rod 4*b* of reduced cross-section, a second closure part 4.2 is additionally fastened on the actuating rod 4*a*/4*b*, the second closure part acting together via a radially acting second closure part seal 9\* with the second seating surface 2*e*\* and controlling the second connection opening 2*d*\*. In the closed position of the second closing part 4.2 the closure part 4 forming a first closing part 4.1 and in the closed position of the first closing part 4.1 the second closure part 4.2 take their respective open position.

If necessary, the valve housing part 2*a* becomes a through housing, if it has additionally to the first connector 2*b* a third connector 2*b*\*, which faces the first connector 2*b*. In an equivalent manner, if necessary, the second valve housing part 2*a*\* becomes a through housing, if it has in addition to the fourth connector 2*b*\*\* a fifth connector 2*b*\*\*\*, which faces the fourth connector 2*b*\*\*.

With the above mentioned configuration the switching function is realized, in which, in the represented upper position of the closure part 4, in which its second closure part 4.2 takes a closed position, a connection is established between the first and eventually the third connector 2*b* resp. 2*b*\* on the one hand and the second connector 2*c* on the other hand. In the lower position of the closure part 4, in which its first closure part 4.1 takes up a closed position, the fourth and eventually the fifth connector 2*b*\*\* resp. 2*b*\*\*\* are connected on the one hand with the first and on the other hand eventually the third connector 2*b* resp. 2*b*\*.

Figure 5:
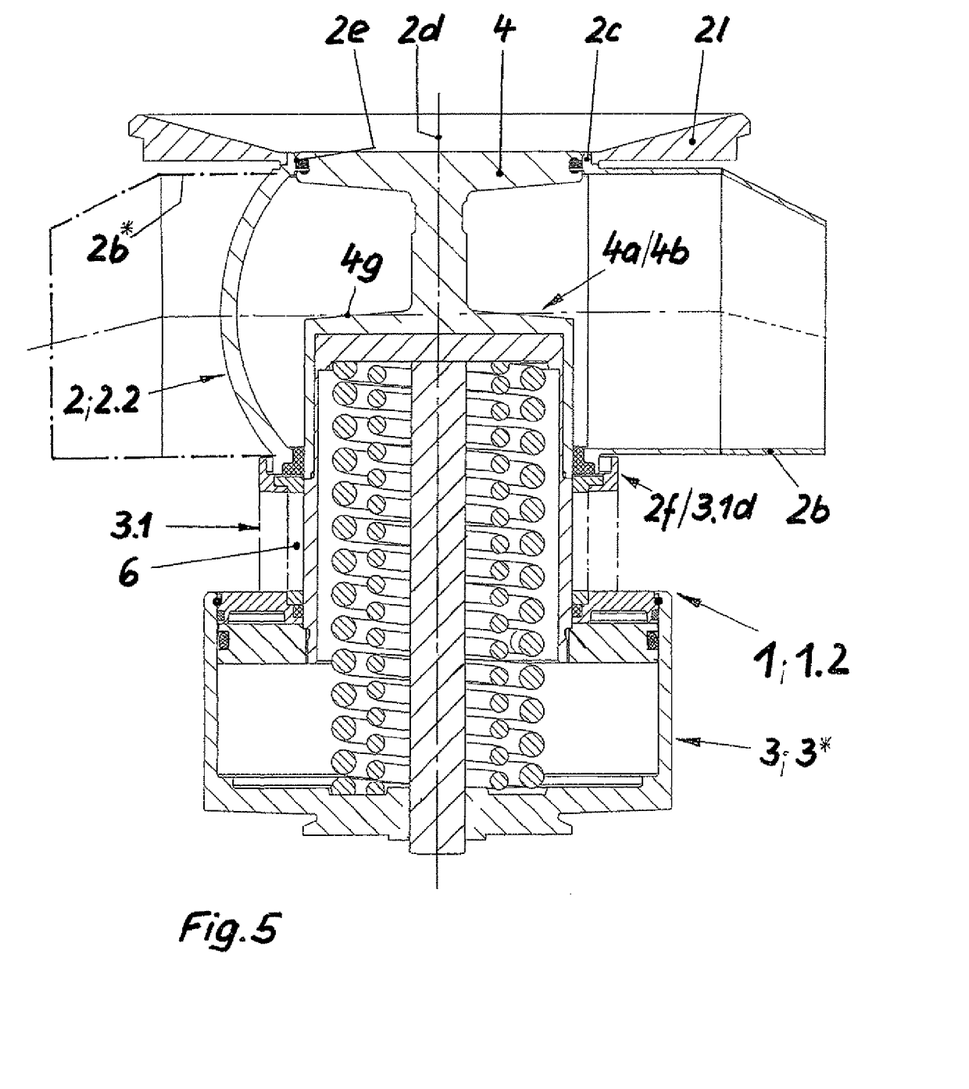
FIG. 5 shows a meridian section through the lift valve according to the invention in a design as a tank-bottom valve, wherein in the represented closed position a spring-closing actuator with the closure part closes the tank-bottom opening and the section plane is chosen in such a way that it goes through the lantern and bearing bush openings overlapping in the section plane.

According to a further suggestion the above described characteristics of the lift valve 1 according to the invention apply on a tank-bottom valve 1.2 (FIG. 5), in which the second connector 2*c* discharge from underneath into a tank bottom 2*l* of a tank or a container and the valve housing 2, 2.2 is designed in the form of a second valve housing 2.2 acting as a tank-bottom valve housing. The latter becomes, if necessary, is a through housing, if it has at the valve housing part 2*a* additionally to the first connector 2*b* a third connector 2*b*\*, which faces the first connector 2*b*.

Finally the above described characteristics of the lift valve 1 according to the invention apply in an advantageous manner on a double seat valve 1.4 (FIG. 3), in which the lantern-type housing 3.1 is connected to an upper valve housing part 2.4*a* presenting at least a first pipe connection 2.4*c* and the second connector 2*c*. Here the upper valve housing part 2.4*a* correspond to the above described valve housing part 2*a* and the first pipe connection 2.4*c* corresponds to the above described first connector 2*b*. Between the first pipe connection 2.4*c* and the second connector 2*c* the connection opening 2*d* is arranged in the upper valve housing part 2.4*a*, in or on which at the seating surface 2*e* is formed. Opposite the connection opening 2*d* is located the housing opening 2*h*, via which an access to the actuator 3 is given on the way over the lantern-type housing 3.1. In this respect the housing configuration corresponds to the one of the above mentioned type with a lift valve 1 working as a single seat valve. The second connector 2c enclosing the connection opening 2d connects the upper valve housing part 2.4a with a lower valve housing part 2.4b, that leads into at least a second pipe connection 2.4d, and consequently the valve housing 2, 2.4 is available in the form of a fourth valve housing 2.4 acting as a double seat valve housing.

Figure 3:
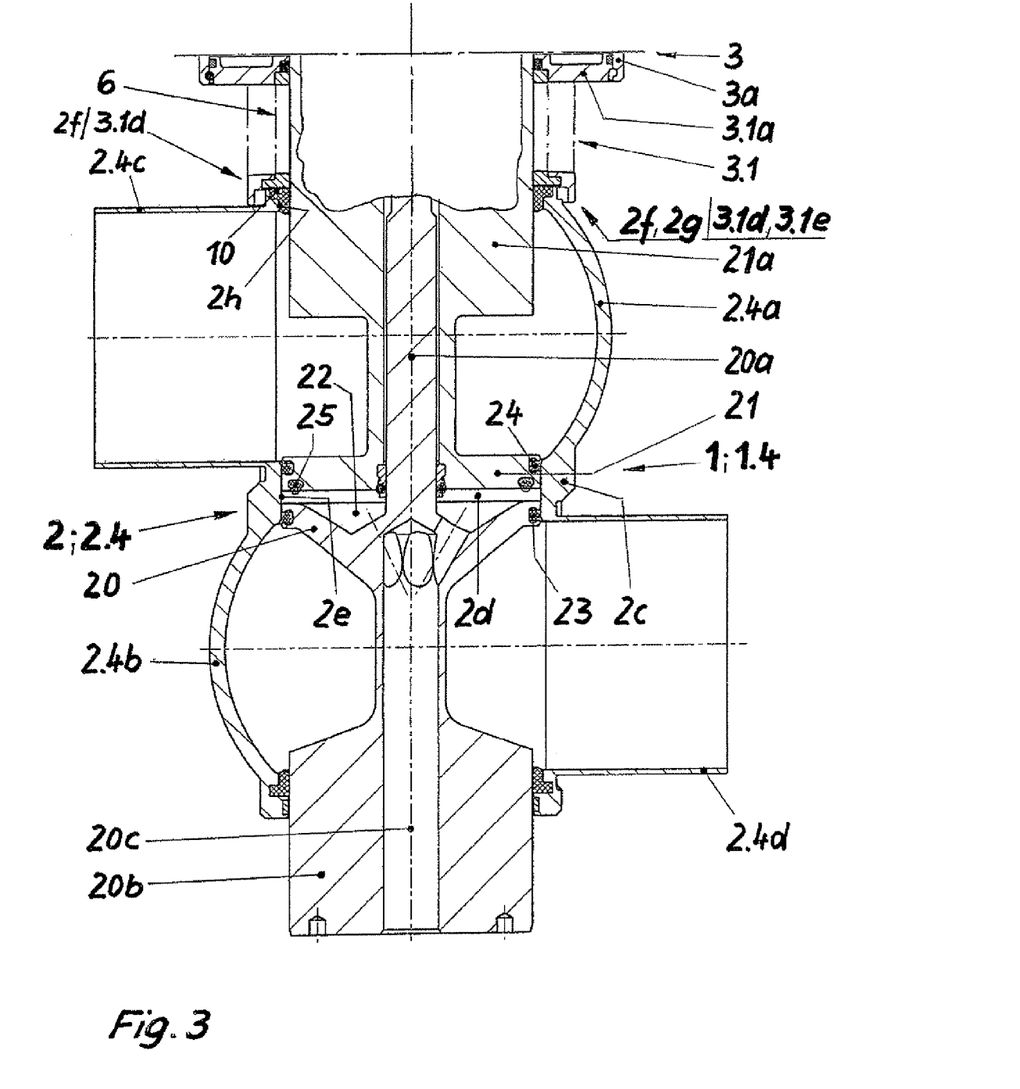
FIG. 3 shows a meridian section through the lift valve according to the invention in a design as a double seat valve.

In the surface area of the connection opening 2d connecting both the valve housing parts 2.4a, 2.4b with one another is formed the cylindrical seating surface 2e, which acts together with an independently driven first closure part 20 and a dependently driven second closure part 21, which is place above it, with regard to the vertical normal position. Both closure parts 20, 21 are designed as so-called sliding pistons with respectively radial sealants (sealing in so-called slide engagement), wherein the first closure part 20 has a first closure part seal 23 on its cylindrical surface area and the second closure part 21 has a second closure part seal 24 on its cylindrical surface area.

In the course of the opening movement of the double seat valve 1.4, first of all the first closure part 20 comes into abutment after a partial stroke against a center seal 25 arranged in the front surface of the second closure part 21, so that then in the course of the further opening movement both closure parts 20, 21 reach their full open position. Between both the closure parts 20, 21 a leakage cavity 22 is provided in both the closed as well as the open position, wherein the leakage cavity is connected to the surrounding of the double seat valve 1.4 via a discharge hole 20c. The discharge hole 20c extends thereby co-axially through a tubular shaft in the form of a pressure equalization piston 20b, which is connected to the first closure part 20, and guided through the lower valve housing part 2.4b and out of it.

The first closure part 20 is connected on the upper side with a first actuating rod 20a, which is guided into the actuator 3, not represented in detail, arranged above the second valve housing 2.4a. The second closure part 21 expands above into a second actuating rod 21a formed as second pressure equalizing piston, which in the form of a hollow rod surrounds the first actuating rod 20a concentrically and is also led into the actuator 3. The actuator 3, preferably a pressure means actuated piston/spring actuator, is in the most general case able to both generate the opening and closing movement of the closure parts 20, 21 as well as their independent respective partial lifting movement in the course of a so-called seat cleaning.

The valve housing part 2.4a, 2.4b becomes if necessary respectively a through housing, if the valve housing part 2.4a, 2.4b has, in addition to the respective pipe connection 2.4c, 2.4d, a further pipe connection, which faces the other pipe connection.

The lantern-type housing 3.1, the which bearing bush 6 arranged therein, which guides the second actuating rod 21a and which in connection with the rod seal 10 seals the second actuating rod 21a with respect to the upper valve housing part 2.4a, and the arrangement and fastening of the lantern-type housing 3.1 via the actuator-sided lantern flange 3.1a at the actuator 3a are realized fully identically to the corresponding components in the lift valve 1 working respectively as a single seat valve of the above described type. This finding also relates to the device according to the invention in the form of the bayonet lock 2f/3.1d as described above and its diverse modifications and variations.

From the aforementioned it is understandable that different modifications and variations can be realized without deviating from the spirit and the new concept of the present invention. This should be understood in a way that no restriction to the described embodiment of the device is intended, which has been represented and described or only as been described therein. The disclosure shall encompass all such modifications, which are within the scope of protection claimed in the claims.

REFERENCE LIST OF THE USED ABBREVIATIONS

1 Lift valve (general)
1.1 Stop valve
1.2 Switching valve
1.3 Tank-bottom valve
1.4 Double seat valve
2 Valve housing (general)
2a Valve housing part
2b First connector
2c Second connector
2d Connection opening
2e Seating surface (cylindrical, cone-shaped, axial)
2f Valve housing-sided bayonet collar
2g Valve housing-sided bayonet recess
2h Housing opening
2i Circular connecting piece
2k Groove-shaped recess
Stop Valve (1.1)
2.1 First valve housing (stop valve housing)
2b* third connector
Tank-Bottom Valve (1.2)
2.2 Second valve housing (tank-bottom valve housing)
2b* third connector
2l tank bottom
Switching Valve (1.3)
2.3 Third valve housing (switching valve housing)
2a* Second valve housing part
2b* Third connector
2b** Fourth connector
2b*** Fifth connector
2d* Second connection opening
2e* (cylindrical) second seating surface
4.1 First closure part
4.2 Second closure part
9* Second closure part seal
3 Actuator (spring closing; spring opening)
3a Actuator housing
3b Cover part
3c Actuator-sided spring abutment
3d Ventilation opening
3e Pressure means opening
3e* Second pressure means opening
3f Clamping flange
3.1 Lantern-type housing
3.1a Actuator-sided lantern flange
3.1b Tubular lantern shaft
3.1c Lantern opening
3.1d Lantern-sided bayonet collar
3.1e Lantern-sided bayonet recess
3.1f Housing ring
3.1g Slot
2f, 2g/3.1d, 3.1e Bayonet joint
2f/3.1d Bayonet lock
4 Closure part (general)
4a/4b Actuating rod
4a Actuating rod of enlarged cross-section (pressure equalization piston)
4b Actuating rod of reduced cross-section
4c Cup-shaped recess 4d Closure part-sided spring abutment
4e Connection end
4f Cup bottom
4f* Second cup bottom
4g Counter pressure surface
4a* Lower part of the pressure equalization piston
4a** Upper part of the pressure equalization piston
4a.1* Internal thread (at the lower part 4a*)
4a.1 Bolt thread (at the upper part 4a)
4a.2** Cup
5 Actuating piston
6 Bearing bush
6a Bush shaft
6b Bush flange
6c Bearing bush opening
6d Lug
7 Actuating spring
7.1 First actuating spring
7.2 Second actuating spring
9 Closure part seal
10 Rod seal
11 First seal (actuator housing)
12 Second seal (actuator housing)
13 Locking ring
14 Vent plug
15 Third seal (pressure equalization piston)
16 Return rod
17 Modified return rod
Double Seat Valve (1.4)
2.4 Fourth valve housing (double seat valve housing)
2.4a Upper valve housing part
2.4b Lower valve housing part
2.4c First pipe connection
2.4d Second pipe connection
20 First closure part
20a First actuating rod
20b First pressure equalization piston
20c Discharge hole
21 Second closure part
21a Second actuating rod (second pressure equalization piston)
22 Leakage cavity
23 First closure part seal
24 Second closure part seal
25 Center seal
D Pressure means
H (full) valve lift; full open position

The invention claimed is:

1. Process valve acting as a lift valve (1; 1.1; 1.2; 1.3; 1.4), with a valve housing (2; 2.1; 2.2; 2.3; 2.4) consisting of at least a valve housing part (2a; 2.4a, 2.4b), with at least a first and a second connectors (2b, 2c; 2.4c, 2c), which are connected to the valve housing part (2a; 2.4a, 2.4b) and establish a connection to its internal space, with a connection opening (2d) arranged between the connectors (2b, 2c; 2.4c, 2c), at least a seating surface (2e) is formed in or on the connection opening with at least a translatably slidable closure part (4; 4.1; 21), which cooperates with the attributed seating surface (2e) and controls the connection opening (2d), with an actuating rod (4a/4b; 21a) fastened on each closure part (4; 4.1; 21), which is guided out of the valve housing (2; 2.1; 2.2; 2.3; 2.4) by a housing opening (2h) of the valve housing (2; 2.1; 2.2; 2.3; 2.4) facing the connection opening (2d) and is connected to an actuating piston (5) of an actuator (3), with a lantern-type housing (3.1) connecting the valve housing (2; 2.1; 2.2; 2.3; 2.4) to the actuator (3), the lantern-type housing (3.1) presenting, at least on its valve housing-sided end, means (2f, 2g/3.1d, 3.1e) for the connection to the valve housing (2; 2.1; 2.2; 2.3; 2.4), wherein the lantern-type housing (3.1) is fastened to the valve housing (2; 2.1; 2.2; 2.3; 2.4) with a bayonet joint (2f, 2g/3.1d, 3.1e), the lantern-type housing (3.1) has on its valve housing-sided end at least two, seen in the radial direction, radial inward projecting lantern-sided bayonet collars (3.1d), which are limited in each case on both sides by lantern-sided bayonet recesses (3.1e) formed therebetween, that the valve housing (2; 2.1; 2.2; 2.3; 2.4), has, externally and in the circumferential area of the housing opening (2h), a corresponding number, seen in the radial direction, of radially outwards projecting valve housing-sided bayonet collars, (2f) which are in each case limited on both sides by valve housing-sided bayonet recesses (2g) formed in between, wherein the lantern-sided bayonet collars (3.1d) engage in an open position of the bayonet joint in the valve housing-sided bayonet recesses (2g) and almost congruently engage in a closed position of the bayonet joint behind the valve housing-sided bayonet collars (2f), and that the bayonet joint (2f, 2g/3.1d, 3.1e) is locked in its closed position positively and self-actuating, the lantern-type housing (3.1) in the extension area related to the circumference of at least one lantern-sided bayonet collar (3.1d) has a groove (3.1g), which extends from the valve housing-sided end of the lantern-housing (3.1) axially therein and, seen in the radial direction, extends throughout from the inside to the outside, each valve housing-sided bayonet collar (2f) has radially on the outside a groove-shaped recess (2k), limited in its radial depth and circumferential extension, wherein in the closed position of the bayonet joint the recess (2k), viewed in the circumferential direction, is positioned congruently with the attributed groove (3.1g), a bearing bush within said lantern-housing, said bearing bush including an outer edge and an end in the area of the valve housing-side, in the area of the valve housing-side end of the bearing bush (6) at least one lug (6d) is arranged thereon, which on the one hand, viewed in the radial direction, projects over the outer edge of the bearing bush (6) and, seen in the axial direction, reaches out beyond the valve housing-side front face of the bearing bush (6), that the lug (6d), viewed in the radial direction, is designed in a resilient manner and engages in the attributed groove (3.1g), and in the closed position of the bayonet joint the end of the lug (6d) engages in the attributed recess (2k).

2. The process valve according to claim 1, wherein two lantern-sided bayonet collars (3.1d) are provided, which are diametrically opposite each other.

3. The process valve according to claim 1, wherein, more than two lantern-sided bayonet collars (3.1d) are provided, which are arranged uniformly distributed over the circumference of the tubular lantern-housing (3.1).

4. The process valve according to claim 1, wherein
the actuating rod (4a/4b; 21a) is guided in said bearing bush (6), which is arranged within the lantern-type housing (3.1) and is fixed.

5. The process valve according to claim 4, wherein
the bearing bush (6) has at least a bearing bush opening (6c) reaching through its wall, viewed in the radial direction.

6. The process valve according to claim 5, wherein
the at least one bearing bush opening (6c) is at least partly covered by the at least one lantern opening (3.1c) in a fluid passable manner.

7. The process valve according to claim 4, wherein
a valve-housing sided bushing flange (6b) of the bearing bush (6) is supported by the valve housing (2; 2.1; 2.2; 2.3; 2.4), that externally surrounds the housing opening (2h), and axially pretensions a rod seal (10) arranged between the housing opening (2h) and the actuating rod (4a/4b).

8. The process valve according to claim 4, wherein
a plurality of grooves are arranged in a distributed manner over the circumference, which penetrate throughout the bearing bush (6), engage in the valve housing-side front side of the bearing bush (6).

9. The process valve according to claim 1, wherein
the respective recess (2k), viewed in the circumferential direction, is arranged centrally in the associated valve housing-side bayonet collar (2f).

10. The process valve according to claim 1, wherein
said valve functions as a stop valve (1.1) and the valve housing (2; 2.1) is designed in the form of a first valve housing (2.1) acting as a stop valve housing.

11. The process valve according to claim 10, wherein
said valve functions as a tank-bottom valve (1.2), in which the second connector (2c) opens up from the bottom into a tank-bottom (21) of a tank or container and the valve housing (2; 2.2) is designed in the form of a second valve housing (2.2) acting as a tank-bottom valve housing.

12. The process valve according to claim 9, wherein
said valve functions as a switching valve (1.3), in which the lantern-type housing (3.1) is connected via a second valve housing (2a*) having at least a fourth connector (2b**) to the valve housing part (2a), and as a result the valve housing (2; 2.3) is designed in the form of a third valve housing (2.3) acting as a switching valve housing, in which both of the valve housing parts (2a, 2a*) are connected via a second connection opening (2d*), in or at which a second seating surface (2e*) is formed, in which on the actuating rod (4a/4b) a second closure part (4.2) is additionally fastened with a second closure part seal (9*), the second closure part cooperating with the second seating surface (2e*) and controlling the second connection opening (2d*), wherein in the closed position of the second closure part (4.2) the closure part (4) forming a first closure part (4.1), and in the closed position of the first closure part (4.1) the second closure part (4.2), take their respective open position.

13. The process valve according to claim 12, wherein
the valve housing (2; 2.3) has, at the second valve housing part (2a*), in addition to the fourth connector (2b), a fifth connector (2b*), which is located opposite the fourth connector (2b**).

14. The process valve according to claim 1, wherein
the valve housing (2; 2.1; 2.2; 2.3) has at the valve housing part (2a), in addition to the first connector (2b), a third connector (2b*), which is located opposite the first connector (2b)
the respective characteristics are used on a stop valve (1.1) and the valve housing (2; 2.1) is designed in the form of a first valve housing (2.1) acting as a stop valve housing.

15. The process valve according to claim 1, wherein
said valve functions as a double seat valve (1.4), which has two serially arranged closure parts (20, 21), movable with respect to each other, which in the closed position of the double seat valve (1.4) prevent the overflow of fluids from one valve housing part (2.4a; 2.4b) into another one (2.4b; 2.4a), which limit a leakage cavity (22) in both the closed as well as the open position (22), the leakage cavity being connected to the surrounding of the double seat valve (1.4), and which, in relation to a vertical arrangement, has on the top the actuator (3) common to both closure parts (20, 21), actuating their respective actuating rod (20a, 21a).

16. The process valve according to claim 1, wherein
both closure parts (20, 21) are designed as sliding pistons, which in the closed position of the double seat valve (1.4) are sealingly received in the connection bore hole (2d) connecting the valve housing parts (2.4a, 2.4b) to each other and forming the cylindrical seating surface (2e), that the first closure part (20) in the course of its opening movement, before it leaves the cylindrical seating surface (2e), sealingly abuts against the second closure part (21) and the latter is also transferred in the further opening movement in a full open position (H), that the double seat valve (1.4) opens to the top and has a discharge hole (20c), which is provided in a pipe barrel (20b) arranged on the first closure part (20), penetrating the second valve housing part (2.4b) in a downward sealed manner, and which connects the leakage cavity (22) to the surroundings.

17. The process valve according to claim 16, wherein
the valve housing part (2.4a, 2.4b) has, in addition to the respective pipe connection (2.4c, 2.4d) a further pipe connection, which is located opposite the other pipe connection.

* * * * *